United States Patent
Kuroda et al.

(10) Patent No.: US 12,428,068 B2
(45) Date of Patent: Sep. 30, 2025

(54) VEHICLE-BODY LOWER STRUCTURE OF VEHICLE

(71) Applicant: Mazda Motor Corporation, Hiroshima (JP)

(72) Inventors: Ippei Kuroda, Hiroshima (JP); Masaya Nishimoto, Hiroshima (JP); Shota Nakayama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 454 days.

(21) Appl. No.: 18/125,130

(22) Filed: Mar. 23, 2023

(65) Prior Publication Data
US 2023/0399054 A1  Dec. 14, 2023

(30) Foreign Application Priority Data
May 23, 2022  (JP) .................... 2022-083945

(51) Int. Cl.
*B62D 25/02* (2006.01)
*B62D 21/15* (2006.01)

(52) U.S. Cl.
CPC ........... *B62D 25/025* (2013.01); *B62D 21/15* (2013.01)

(58) Field of Classification Search
CPC ..... B62D 25/025; B62D 21/15; B62D 27/023
USPC ............ 296/209, 187.1, 187.09, 29, 30
See application file for complete search history.

(56) References Cited

U.S. PATENT DOCUMENTS

| | | | |
|---|---|---|---|
| 10,189,505 B2 * | 1/2019 | Narahara | B62D 25/025 |
| 11,273,870 B2 * | 3/2022 | Muraoka | B62D 25/04 |
| 2016/0194032 A1 * | 7/2016 | Yamamoto | B62D 21/15 |
| | | | 296/193.05 |

FOREIGN PATENT DOCUMENTS

JP   2015-058749 A   3/2015

* cited by examiner

*Primary Examiner* — Dennis H Pedder
(74) *Attorney, Agent, or Firm* — XSENSUS LLP (57) ABSTRACT

A side sill that is disposed in a lower part and on an outer side in a vehicle width direction of a vehicle and has a side sill inner and a side sill outer which collaborate with each other to form a closed cross section extending in a front-rear direction of the vehicle; a wheel that is located ahead of the side sill outer; an outer-side reinforcement member that has a shape extending along a front face part and a side face part in a front end part of the side sill outer and is joined to the front end part from inside the closed cross section; and an inner-side reinforcement member that diagonally couples a front face part and a side face part in a front end part of the side sill inner to each other.

9 Claims, 10 Drawing Sheets

VEHICLE-BODY LOWER STRUCTURE OF VEHICLE

CROSS-REFERENCE TO RELATED APPLICATION

The present application claims priority to Japanese Patent Application 2022-083945, filed May 23, 2022, the entire contents of which are incorporated herein by reference.

BACKGROUND

Field

The present disclosure relates to a vehicle-body lower structure of a vehicle including, for example: a side sill that forms a closed cross section extending in a front-rear direction of a vehicle on an outer side in a vehicle width direction; and a wheel that is located ahead of the side sill.

Description of the Related Art

Typically, at the time of so-called a small overlap collision in which a barrier partially collides, from ahead of a vehicle, with a front face of the vehicle at an end part located outward of a front side frame in the vehicle width direction, a wheel pulled back collides with a side sill front end part, and thus a collision load directed rearward and inward in the width direction is input to the side sill front end part.

The side sill front end part preferably can generate a reaction force in the vehicle width direction, which is large enough to bounce the wheel back outward for example, against the collision load directed inward in the width direction and input by the wheel, which enables a vehicle body to evade the barrier in the vehicle width direction by turning itself, for example, and thus makes it possible to inhibit the vehicle body from being reinforced excessively.

Meanwhile, the vehicle side structure of Patent document 1 is proposed as a configuration including a reinforcement member that reinforces a side sill front end part against a small overlap collision.

The vehicle side structure of Patent document 1 is provided, on an inner face in the vehicle width direction of a side sill outer front end part located on the outer side in the vehicle width direction of a side sill front end part, with an outer-side reinforcement member (30) that reinforces at least a front face and an outer face in the vehicle width direction of the side sill outer front end part.

However, even if provided with the outer-side reinforcement member (30) on the inner face in the vehicle width direction, the side sill outer may be displaced inward in the vehicle width direction together with the outer-side reinforcement member (30) when a load directed inward in the width direction is input to the side sill front end part, so that an intended reaction force in the width direction may not be able to be achieved.

PRIOR ART DOCUMENTS

Patent Documents

[Patent document 1] JP-A-2015-058749

SUMMARY

The present disclosure has been made in view of such a problem, and aims to provide a vehicle-body lower structure of a vehicle capable of inhibiting a side sill front end part from getting crushed and achieving a reaction force in a vehicle width direction against a collision load directed inward in the vehicle width direction and input to the side sill front end part at the time of a small overlap collision.

Means for Solving the Problem

A vehicle-body lower structure of a vehicle according to the present disclosure includes: a side sill that is disposed in a lower part and on an outer side in a vehicle width direction of a vehicle and has a side sill inner located on an inner side in the vehicle width direction and a side sill outer located on the outer side in the vehicle width direction, the side sill inner and the side sill outer collaborating with each other to form a closed cross section that extends in a front-rear direction of the vehicle; a wheel that is located ahead of the side sill outer; an outer-side reinforcement member that has a shape extending along a front face part and a side face part in a front end part of the side sill outer and is joined to the front end part from the closed cross section side; and an inner-side reinforcement member that diagonally couples a front face part and a side face part in a front end part of the side sill inner to each other.

According to the above configuration, when a collision load directed inward in the vehicle width direction is input to the side sill front end part, the side sill outer front end part tries to be displaced inward in the vehicle width direction with its shape kept by the outer-side reinforcement member.

Thereby, a load directed inward in the vehicle width direction is input to the side sill inner front end part by the side sill outer front end part. Since the inner-side reinforcement member can inhibit the part between the front face part and the side face part of the side sill inner front end part from being bent and deformed by the input of the load directed inward in the vehicle width direction, it is possible to inhibit the side sill front end part from getting crushed and deformed inward in the vehicle width direction and generate a reaction force in the vehicle width direction.

Accordingly, it is possible to make the vehicle body evade a barrier in the vehicle width direction, and thus inhibit the vehicle body from being reinforced excessively.

As an aspect of the present disclosure, it is preferable that an inner vertical ridge line that extends in a vertical direction is formed in a boundary part between the front face part and the side face part of the front end part of the side sill inner, and a portion of the inner-side reinforcement member that straddles the inner vertical ridge line in a direction in which the inner-side reinforcement member extends is provided so as to be located away from the inner vertical ridge line toward the inner side of the closed cross section.

According to the above configuration, it is possible to efficiently inhibit the inner vertical ridge line from being bent and deformed while suppressing a weight increase of the inner-side reinforcement member provided between the front face part and the side face part of the front end part of the side sill inner.

As another aspect of the present disclosure, it is preferable that the portion of the inner-side reinforcement member that straddles the inner vertical ridge line in the direction in which the inner-side reinforcement member extends has a bead that protrudes to the inner side or the outer side of the closed cross section.

According to the above configuration, it is possible to enhance the bending rigidity of the portion of the inner-side reinforcement member that straddles the inner vertical ridge line in the direction in which the inner-side reinforcement member extends, and further inhibit the inner vertical ridge line of the front end part of the side sill inner from being bent and deformed.

As still another aspect of the present disclosure, it is preferable that the bead extends continuously at least over the portion of the inner-side reinforcement member that straddles the inner vertical ridge line in the direction in which the inner-side reinforcement member extends.

According to the above configuration, it is possible to enhance the bending rigidity of the inner-side reinforcement member, and further inhibit the inner vertical ridge line from being bent and deformed.

As still another aspect of the present disclosure, it is preferable that the outer-side reinforcement member has a protrusion part, which protrudes inward in the closed cross section, at the same height position as the bead of the inner-side reinforcement member and at a position coinciding with the bead in the front-rear direction.

According to the above configuration, at the time of input of a collision load directed inward in the vehicle width direction and input to the side sill front end part, depending on its input mode, it is possible to cause the protrusion part of the outer-side reinforcement member displaced inward in the vehicle width direction to come into contact with the bead of the inner-side reinforcement member from the outer side in the vehicle width direction.

Thus, a load transmission part extends continuously to the inner side in the vehicle width direction between the outer-side reinforcement member and the inner-side reinforcement member, which helps transmission of the load to the inner side in the vehicle width direction.

As still another aspect of the present disclosure, it is preferable that the inner-side reinforcement member is formed to have higher strength than the outer-side reinforcement member.

According to the above configuration, the inner-side reinforcement member, which has relatively high strength, receives and supports the outer-side reinforcement member that is displaced inward in the vehicle width direction at the time of input of a collision load directed inward in the vehicle width direction, whereby the collision load directed inward in the vehicle width direction can be received effectively.

As still another aspect of the present disclosure, it is preferable that the vehicle-body lower structure of a vehicle further includes an inner lateral ridge line reinforcement member that reinforces an inner lateral ridge line extending in the front-rear direction along a boundary part between an upper face part and the side face part of the side sill inner, and the inner lateral ridge line reinforcement member extends in the front-rear direction along the inner lateral ridge line and is provided at a position overlapping with the inner-side reinforcement member in the front-rear direction.

According to the above configuration, for example, when a rearward collision load is input to the side sill front end part due to a small overlap collision, the collision load having been input to the inner-side reinforcement member can be transmitted to the rear side of the vehicle efficiently by the inner lateral ridge line reinforcement member.

Advantages

According to the above configuration, it is possible to inhibit a side sill front end part from getting crushed and achieve a reaction force in a vehicle width direction against a collision load directed inward in the vehicle width direction and input to the side sill front end part at the time of a small overlap collision.

DETAILED DESCRIPTION

Hereinbelow, an embodiment of the present disclosure will be described in detail based on the drawings.

Note that, since a vehicle-body lower structure 1 of a vehicle according to this embodiment is substantially symmetric, a description will be made based on a right-side vehicle lower structure. In the drawings, an arrow F indicates a front side of the vehicle, an arrow U indicates an upper side of the vehicle, an arrow OUT indicates an outer side in a vehicle width direction (vehicle exterior side), and an arrow IN indicates an inner side in the vehicle width direction (vehicle interior side). In addition, in the drawings, a mark "X" indicates a spot welding part.

Figure 1:
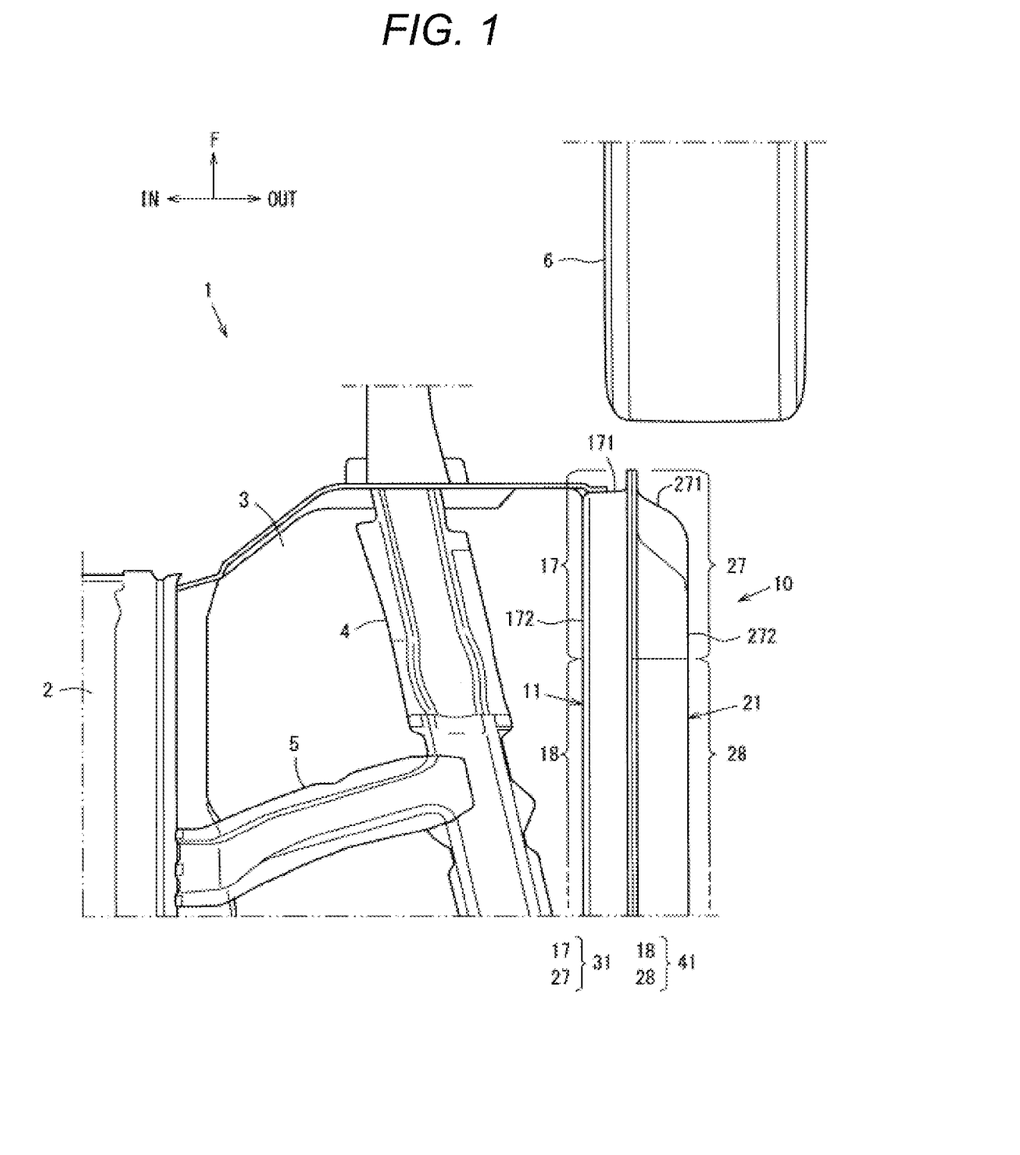
FIG. 1 is a plan view illustrating a chief part of a vehicle lower part according to this embodiment.
Figure 2:
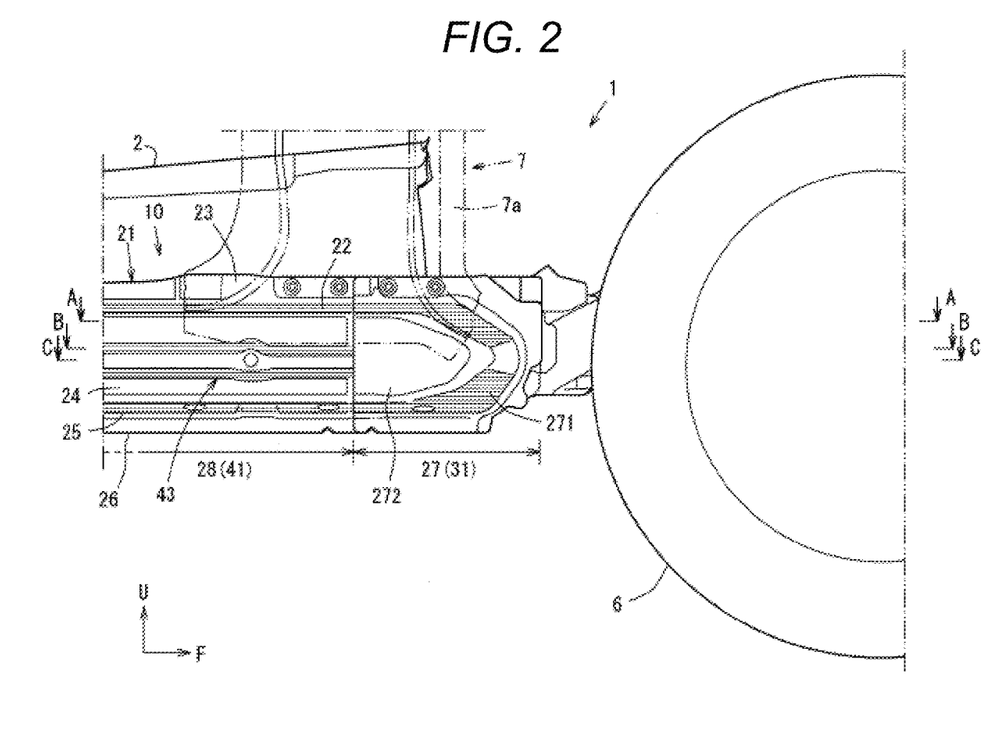
FIG. 2 is a side view illustrating the chief part of the vehicle lower part according to this embodiment.

As illustrated in FIGS. 1 and 2, the vehicle-body lower structure 1 of this embodiment is provided with a tunnel part 2 that protrudes upward and extends in a front-rear direction at the center in the vehicle width direction of a bottom face of a vehicle interior. A platy floor panel 3 (see FIG. 1) forming a floor face of the vehicle interior is disposed horizontally on the bottom face of the vehicle interior at each of right and left sides of the tunnel part 2. Each of right and left end parts of the bottom face of the vehicle interior includes a side sill 10 that extends in the front-rear direction. The floor panel 3 on each of the right and left sides has an outer end part in the vehicle width direction that is joined to an inner face in the vehicle width direction of the corresponding one of the right and left side sills 10. Note that, as illustrated in FIG. 1, the floor panel 3 is provided with a floor frame 4 that extends in the front-rear direction and a cross member 5 that extends in the vehicle width direction.

As illustrated in FIGS. 1 and 2, the vehicle body is provided with a wheel 6 as a front wheel at a position ahead of the side sill 10. The wheel 6 is disposed ahead of a front end of the side sill 10 and disposed at a position coinciding at least partially with the side sill 10 in the vehicle width direction.

As illustrated in FIG. 1, in this embodiment, the wheel 6 has an inner end in the vehicle width direction that is disposed outward in the vehicle width direction of an inner end in the vehicle width direction of the side sill 10, and the wheel is disposed closer to the outer side in the vehicle width direction than the side sill 10. Note that more than half of an upper side of the wheel 6 is covered with an arch-shaped wheel house.

A lower part of a hinge pillar 7 that extends in a vertical direction along a front edge of a side door opening of the vehicle interior is joined to a front part of the side sill 10 (see the hinge pillar 7 illustrated by a virtual line in FIG. 2). Note that, the lower part of the hinge pillar 7, that is, a base part of the hinge pillar to be joined to the front part of the side sill 10 is formed in such a way that its width in the front-rear direction becomes wider as it goes downward.

The hinge pillar 7 includes a hinge pillar inner that is disposed on the inner side in the vehicle width direction and a hinge pillar outer 7a that is disposed on the outer side in the vehicle width direction. By joining and securing both members to each other, the hinge pillar forms, in its inner part, a closed cross section that extends continuously in the vertical direction.

As illustrated in FIGS. 1 to 8, the side sill 10 includes a side sill inner 11 that has a hat-shaped cross section open outward in the vehicle width direction and a side sill outer 21 that has a hat-shaped cross section open inward in the vehicle width direction. As illustrated in FIGS. 3 to 8, by the side sill inner 11 located on the inner side in the vehicle width direction and the side sill outer 21 located on the outer side in the vehicle width direction collaborating with each other, the side sill 10 forms, in its inner part, a closed cross section 10s that extends continuously in the front-rear direction.

Figure 6:
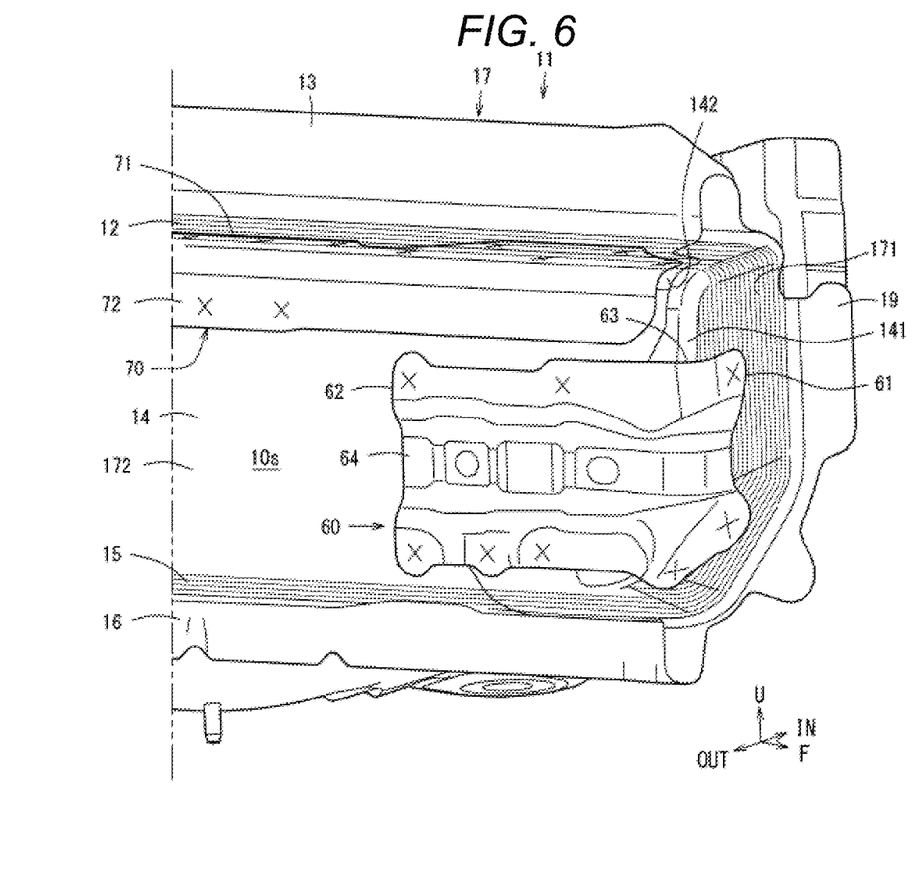
FIG. 6 is a perspective view illustrating a side sill inner front end part and its periphery, viewed from the vehicle exterior side.
Figure 8:
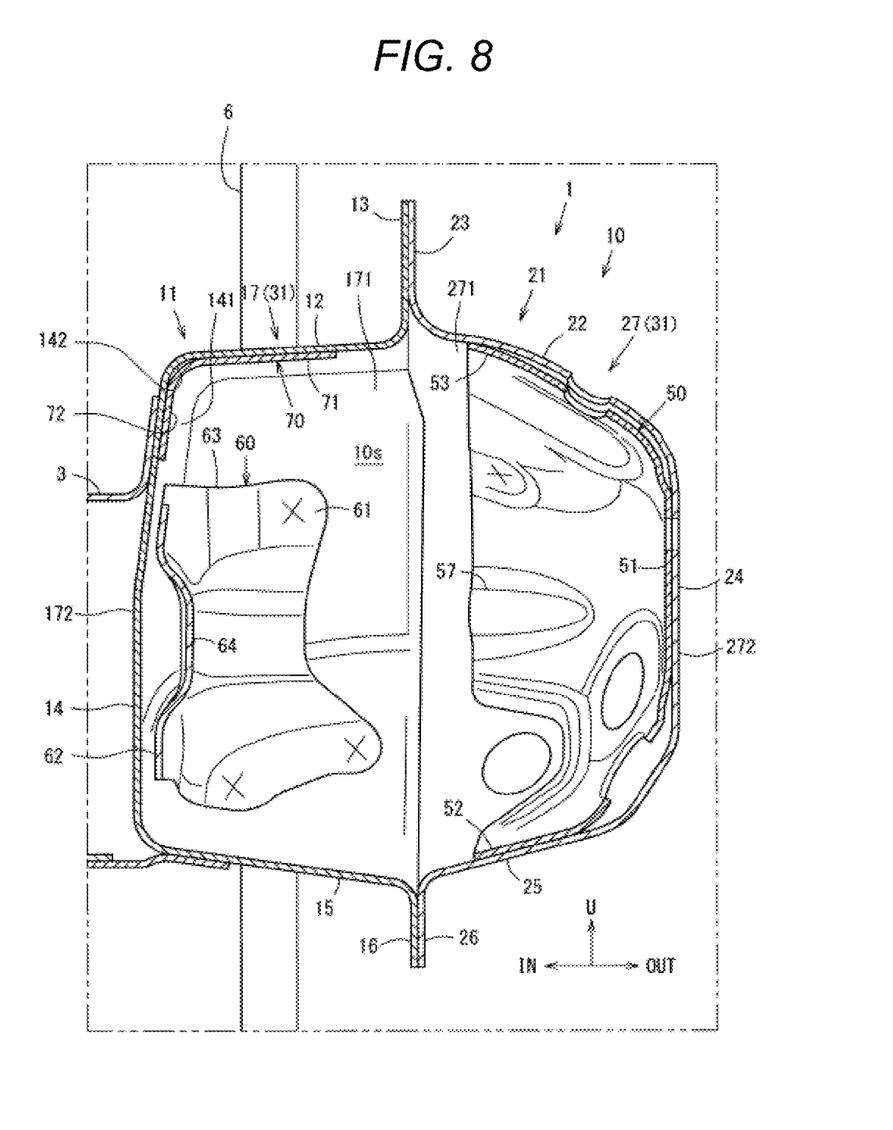
FIG. 8 is a cross-sectional view of the side sill front end part taken along a line E-E of FIG. 3 or 9, viewed along an arrow direction.

Specifically, as illustrated in FIGS. 6 and 8, the side sill inner 11 includes: an inner-side upper face part 12 that extends substantially horizontally; an upper-end flange part 13 that extends upward from an outer edge of the inner-side upper face part 12 in the vehicle width direction; an inner-side side face part 14 that extends downward from an inner edge of the inner-side upper face part 12 in the vehicle width direction; an inner-side lower wall part 15 that extends outward in the vehicle width direction from a lower edge of the inner-side side face part 14; and a lower-end flange part 16 that extends downward from an outer edge of the inner-side lower wall part 15 in the vehicle width direction.

Figure 4:
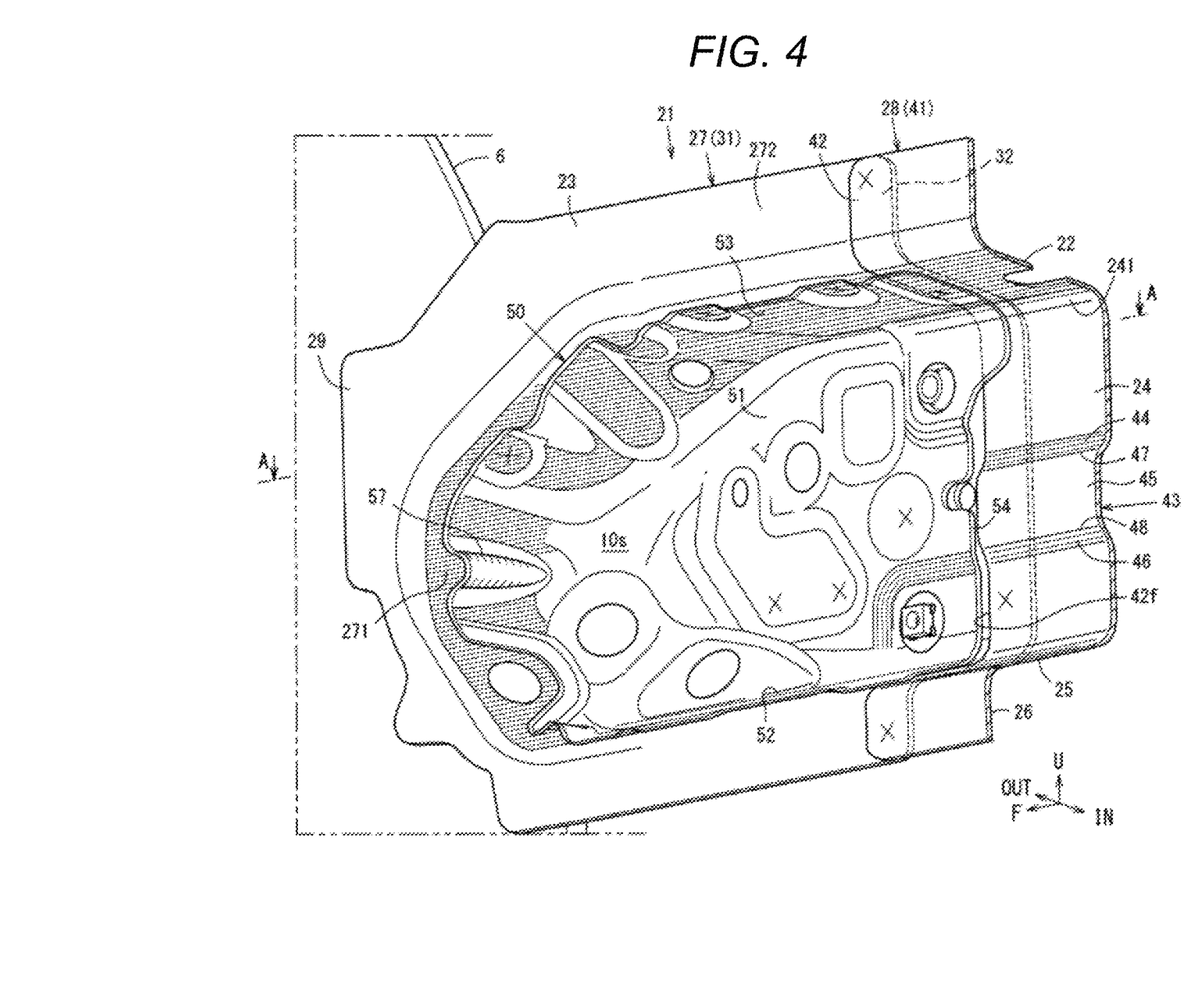
FIG. 4 is a perspective view illustrating a side sill outer front end part and its periphery, viewed from the vehicle interior side.

As illustrated in FIGS. 4 and 8, the side sill outer 21 includes: an outer-side upper face part 22 that extends substantially horizontally; an upper-end flange part 23 that extends upward from an outer edge of the outer-side upper face part 22 in the vehicle width direction; an outer-side side face part 24 that extends downward from the outer edge of the outer-side upper face part 22 in the vehicle width direction; an outer-side lower wall part 25 that extends inward in the vehicle width direction from a lower edge of the outer-side side face part 24; and a lower-end flange part 26 that extends downward from an inner edge of the outer-side lower wall part 25 in the vehicle width direction.

As illustrated in FIG. 8, by the upper-end flange parts 13 and 23 of the side sill inner 11 and the side sill outer 21 joined to each other by welding or the like and the lower-end flange parts 16 and 26 thereof joined to each other by welding or the like in a cross-sectional view taken along a plane orthogonal to a longitudinal direction, the side sill forms the closed cross section 10s described above in its inner part.

As illustrated in FIGS. 1 to 6, the side sill 10 described above includes a side sill front end part 31 that extends rearward from the front end of the side sill 10 and a side sill main body part 41 that is substantially wholly disposed behind a rear end of the side sill front end part 31. As illustrated in FIG. 2, a boundary part between the side sill front end part 31 and the side sill main body part 41 corresponds to a position in the longitudinal width of the hinge pillar 7, and to a substantially intermediate position in the front-rear direction of the hinge pillar 7 in this example.

As illustrated in FIGS. 1 to 5 and FIG. 9, the side sill outer 21 includes a side sill outer front end part 27 and a side sill outer main body part 28. As illustrated in FIGS. 1, 3, 5, 6, and 9, the side sill inner 11 includes a side sill inner front end part 17 and a side sill inner main body part 18. The side sill front end part 31 is formed by the side sill outer front end part 27 and the side sill inner front end part 17, and the side sill main body part 41 is formed by the side sill outer main body part 28 and the side sill inner main body part 18.

Figure 3:
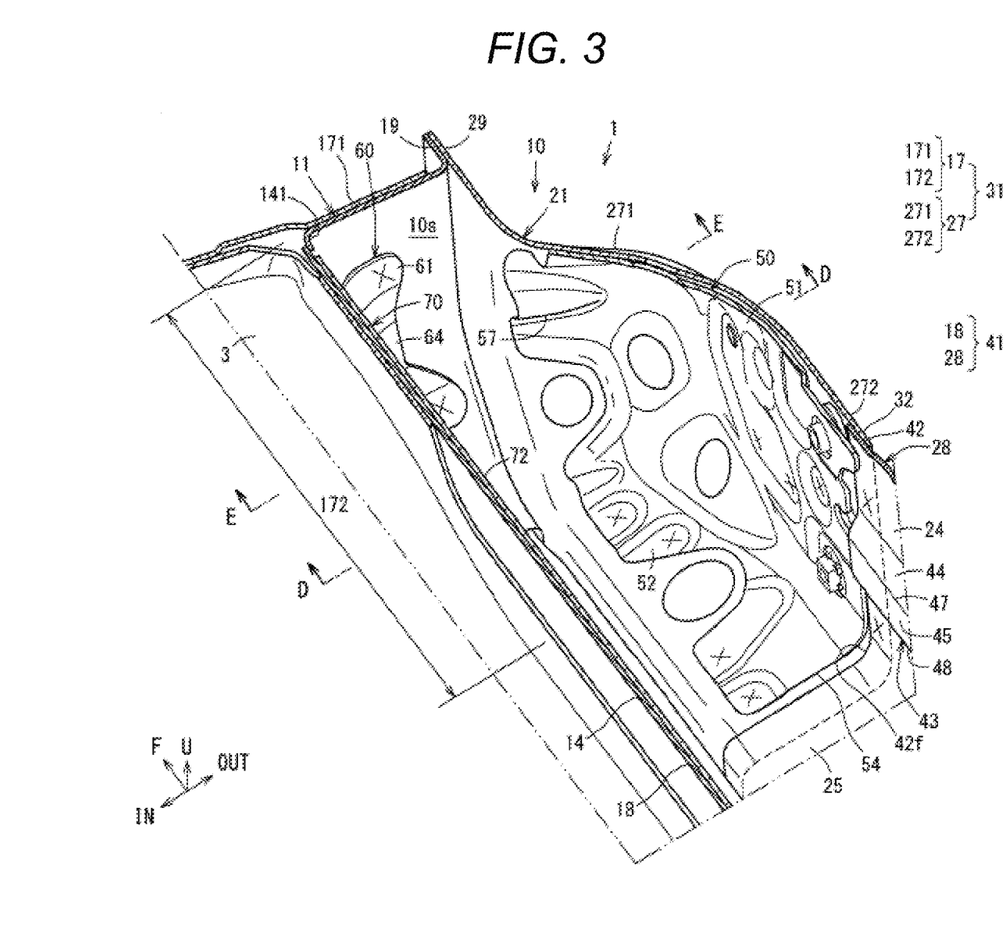
FIG. 3 is a perspective cross-sectional view of the chief part taken along a line A-A of FIG. 2, viewed from an upper and vehicle interior side.
Figure 5:
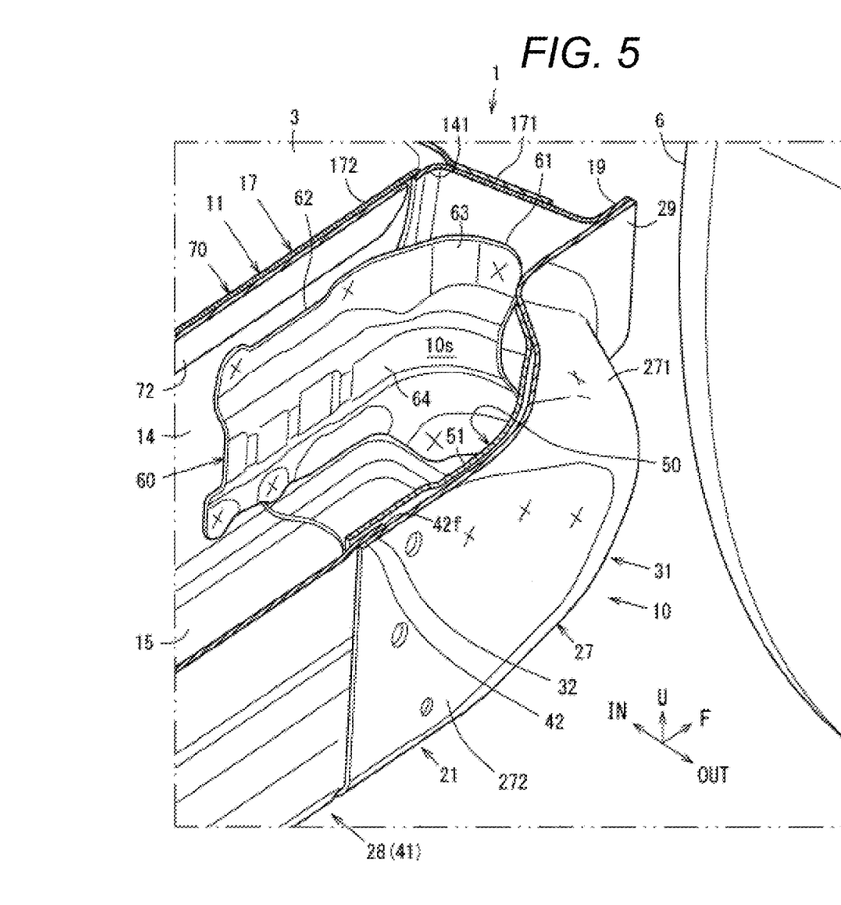
FIG. 5 is a perspective cross-sectional view of the chief part taken along the line A-A of FIG. 2, viewed from a rear and vehicle exterior side.

As illustrated in FIGS. 3 to 5, in a boundary part between the side sill outer front end part 27 and the side sill outer main body part 28, a rear-end flange 32 of the side sill outer front end part 27 and a front-end flange 42 of the side sill outer main body part 28 are joined to each other by spot welding or the like while overlapping with each other in a thickness direction. In this embodiment, the rear-end flange 32 of the side sill outer front end part 27 is joined to the front-end flange 42 of the side sill outer main body part 28 from outside (the outer side in the vehicle width direction of) the closed cross section 10s.

Note that, in this embodiment, although the side sill outer 21 is formed of at least two members constituted of the side sill outer front end part 27 and the side sill outer main body part 28 as illustrated in FIGS. 1 to 5, the side sill outer may be formed of a single member that is continuous in the front-rear direction including the boundary part of these parts.

On the other hand, in the side sill inner 11, although the side sill inner front end part 17 and the side sill inner main body part 18 are not formed of separate members but formed of a single member as illustrated in FIGS. 1, 3, 5, and 6, these parts may be formed of separate members as front and rear side areas separated by their boundary part.

As illustrated in FIG. 1, FIGS. 3 to 5, and FIG. 9, the side sill outer front end part 27 includes an outer front face part 271 that forms a front wall of the side sill outer 21 and an outer front end rear part 272 that is located behind the outer front face part 271.

As described previously, the outer front face part 271 and the outer front end rear part 272 are formed in a hat shape in cross section open inward in the vehicle width direction (see FIGS. 4 and 8). However, as illustrated in FIG. 4, the outer front face part 271 is formed in a bowl shape that is gradually reduced in diameter in the vertical direction and the vehicle width direction from a front end of the outer front end rear part 272 toward the front.

Specifically, as illustrated in FIG. 4, as in the outer front end rear part 272, the outer front face part 271 has the outer-side upper face part 22, the upper-end flange part 23, the outer-side side face part 24, the outer-side lower wall part 25, and the lower-end flange part 26. However, as illustrated in FIG. 1, FIGS. 3 to 5, and FIGS. 7 and 9, the outer-side side face part 24 of the outer front face part 271 gently inclines from a front end of the outer-side side face part 24 of the outer front end rear part 272 to an inner end in the vehicle width direction of the side sill outer 21 as it extends forward.

As illustrated in FIGS. 2 and 4, the outer-side upper face part 22 and the outer-side lower wall part 25 of the outer front face part 271 gently incline from front ends of the outer-side upper face part 22 and the outer-side lower wall part 25 of the outer front end rear part 272 to the vicinity of an intermediate part in the vertical direction of the side sill outer 21 as they extend forward.

Figure 7:
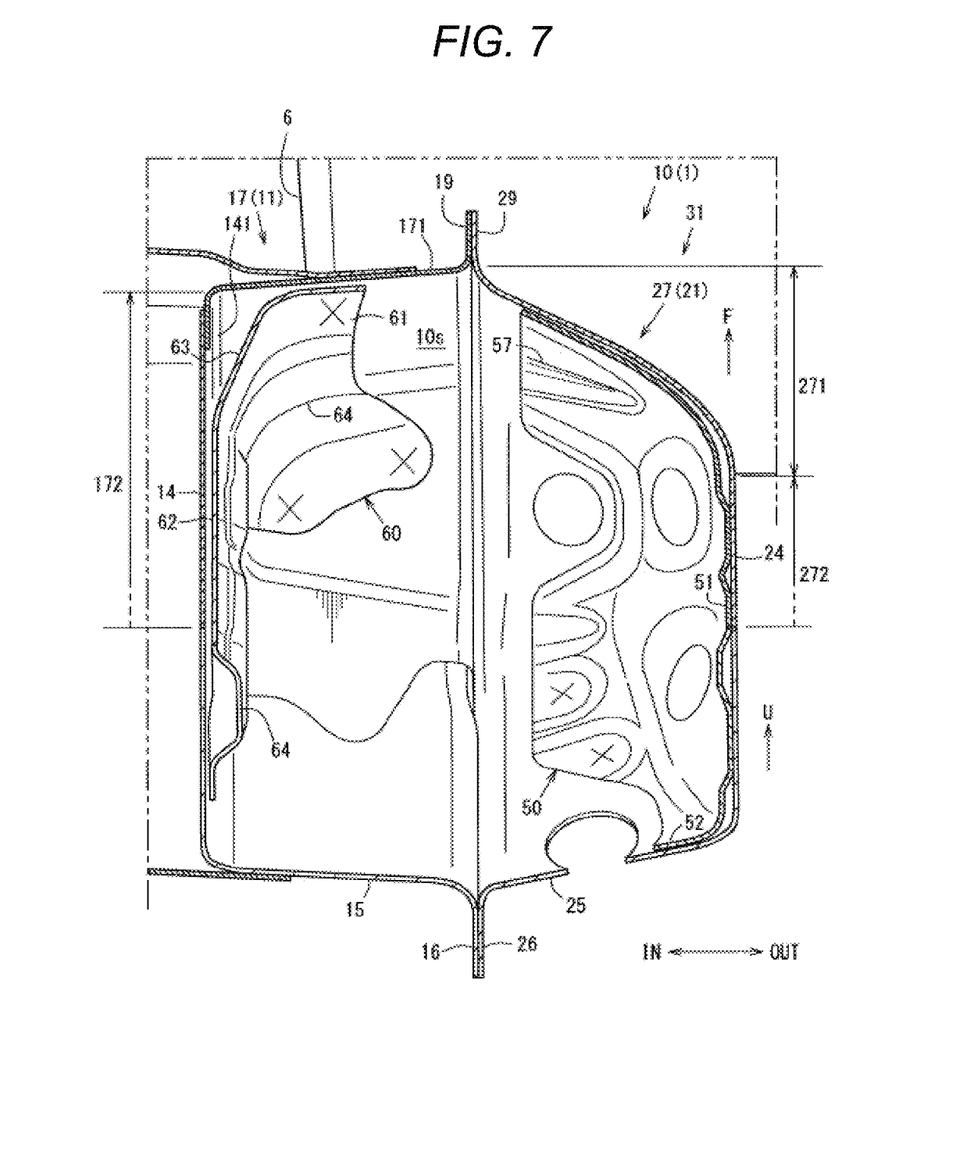
FIG. 7 is a cross-sectional view of a side sill front end part taken along a line B-B of FIG. 2 and along a line D-D of FIG. 3 or 9, viewed from an upper and rear side.
Figure 9:
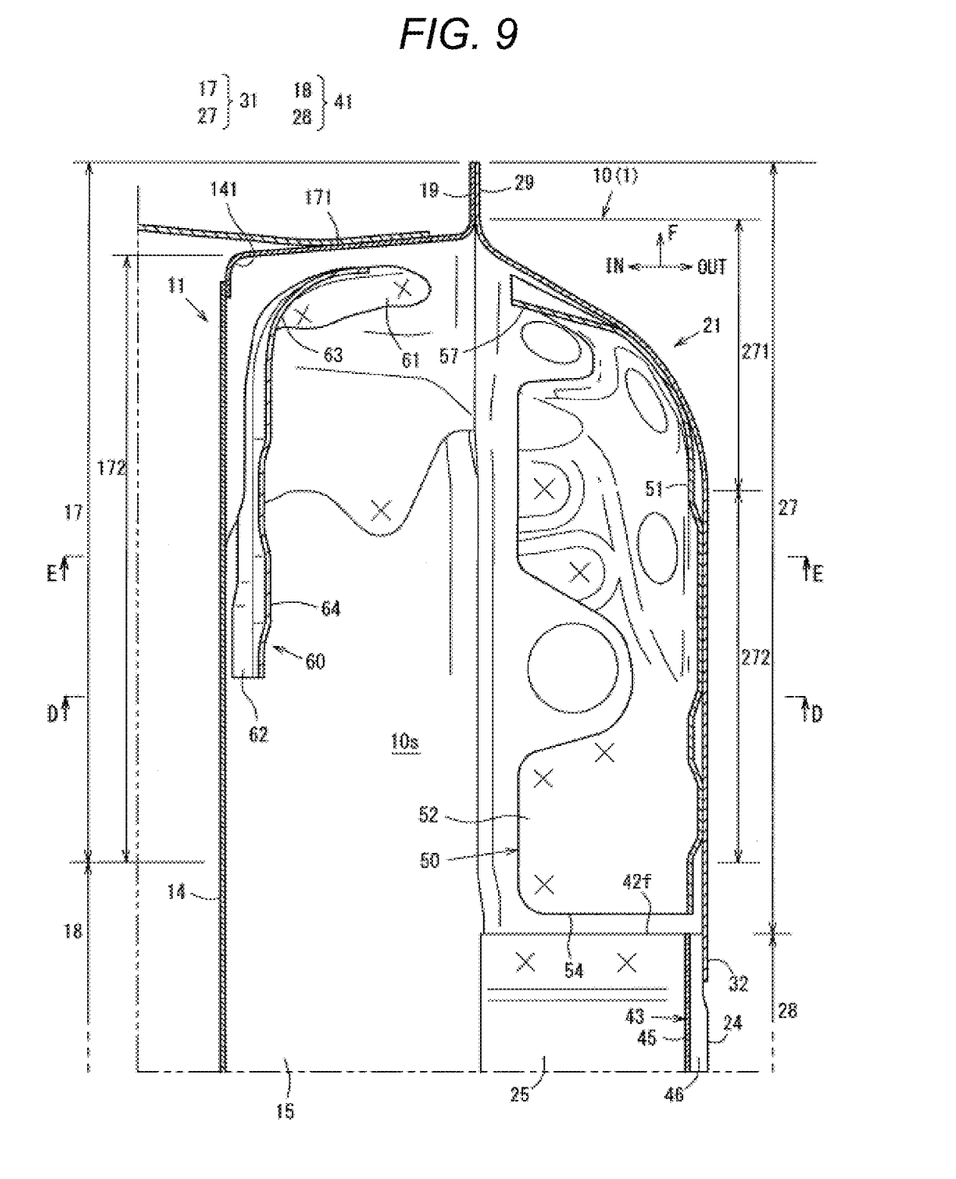
FIG. 9 is a cross-sectional view of the chief part taken along a line C-C of FIG. 2.

In addition, as illustrated in FIGS. 4, 7, and 9, the side sill outer front end part 27 extends smoothly in the front-rear direction while a ridge line extending in the vertical direction along a boundary part between a rear end of the outer front face part 271 and the front end of the outer front end rear part 272 is not formed in the boundary part.

Note that, in this embodiment, the side sill outer front end part 27 includes the outer front face part 271 and the outer front end rear part 272; however, not being limited thereto, the side sill outer front end part 27 does not necessarily have to include the outer front end rear part 272 and may be formed only of the outer front face part 271 that is gradually reduced in diameter from a front 42$f$ (see FIGS. 4 and 9) of the side sill outer main body part 28 toward the front.

In addition, as described previously, the side sill outer main body part 28 is formed in a hat shape in cross section open inward in the vehicle width direction as described above (see FIG. 4).

As illustrated in FIGS. 3, 4, and 9, an outer-side protrusion part 43 that protrudes inward in the vehicle width direction from its periphery is provided at a substantially intermediate position in the vertical direction of the outer-side side face part 24 of the side sill outer main body part 28. The outer-side protrusion part 43 extends continuously rearward from the front end 42$f$ of the side sill outer main body part 28.

As illustrated in FIG. 4, in the outer-side side face part 24 of the side sill outer main body part 28, the outer-side protrusion part 43 has: an upper wall part 44 that stands inward in the vehicle width direction (to the inner side of the closed cross section 10$s$) from its periphery; a vertical wall part 45 that extends downward in a vertical wall shape from an inner end in the vehicle width direction of the upper wall part 44; and a lower wall part 46 that stands inward in the vehicle width direction from its periphery to a lower end of the vertical wall part 45.

In a boundary part between the vertical wall part 45 and the upper wall part 44 of the outer-side protrusion part 43, an upper-side lateral ridge line 47 that extends continuously rearward from the front end 42$f$ of the outer-side protrusion part 43 along this boundary part. In addition, in a boundary part between the vertical wall part 45 and the lower wall part 46 of the outer-side protrusion part 43, a protrusion part lower-side lateral ridge line 48 that extends continuously rearward from the front end 42$f$ of the outer-side protrusion part 43 along this boundary part.

In addition, as illustrated in FIG. 3, FIGS. 5 to 7, and FIG. 9, the side sill inner front end part 17 includes an inner front face part 171 that forms a front wall of the side sill inner 11; and an inner front end rear part 172 that is located behind the inner front face part 171.

As illustrated in FIG. 6, the side sill inner 11 is formed in such a way that, while the inner front face part 171 is formed in a vertical wall shape extending in the vehicle width direction and the vertical direction, an area extending across the inner front end rear part 172 and the side sill inner main body part 18 (see FIG. 9) is formed in a hat shape in cross section open outward in the vehicle width direction as described above.

Specifically, the side sill inner 11 has a configuration such that the inner-side upper face part 12 extends continuously rearward from an upper end of the inner front face part 171, the inner-side side face part 14 extends continuously rearward from an inner end in the vehicle width direction of the inner front face part 171, and the inner-side lower wall part 15 extends continuously rearward from a lower end of the inner front face part 171, respectively.

As illustrated in FIGS. 5, 6, and 9, in a boundary part between the inner front face part 171 and the inner-side side face part 14, an inner vertical ridge line 141 is formed so as to extend in the vertical direction along this boundary part. Note that, in this embodiment, the inner front face part 171 and the inner front end rear part 172 are formed by separate members, and are joined to each other by welding or the like with their end parts overlapping with each other in the thickness direction in their boundary part (see FIGS. 3, 5, and 6).

In addition, as illustrated in FIGS. 6 and 8, an inner lateral ridge line 142 is formed in the side sill inner 11 so as to extend in the front-rear direction along a boundary part between the inner-side upper face part 12 and the inner-side side face part 14.

Further, as illustrated in FIGS. 3 to 7 and FIG. 9, front-end flange parts 19 and 29 that protrude forward are formed at an outer end in the vehicle width direction of the inner front face part 171 and an inner end in the vehicle width direction of the outer front face part 271 described above, respectively. The front-end flange parts 19 and 29 are joined to each other by welding or the like while overlapping with each other in the vehicle width direction.

As illustrated in FIGS. 3 to 5 and FIGS. 7 to 9, the side sill outer front end part 27 includes an outer-side reinforcement member 50 that reinforces the side sill outer front end part 27. The outer-side reinforcement member 50 has a shape extending along the side sill outer front end part 27.

Specifically, as illustrated in the drawings such as FIG. 4, the outer-side reinforcement member 50 is formed in a bowl shape so as to correspond to the bowl-shaped side sill outer front end part 27, and includes: an outer-side side face reinforcement part 51 that extends along the outer-side side face part 24 of the side sill outer front end part 27; an outer-side lower wall reinforcement part 52 that extends along the outer-side lower wall part 25; and an outer-side upper wall reinforcement part 53 that extends along the outer-side upper face part 22.

The outer-side reinforcement member 50 is joined to the side sill outer front end part 27 by welding or the like from inside the closed cross section 10$s$ of the side sill 10 so as to be substantially wholly superimposed on the side sill outer front end part.

As illustrated in the drawings such as FIG. 4, the outer-side reinforcement member 50 is formed so as to extend over substantially the entire length in the front-rear direction of the side sill outer front end part 27 excluding the front-end flange part 29, and its rear end 54 is substantially wholly located ahead of the front end 42$f$ of the side sill outer main body part 28.

As illustrated in FIG. 3 and FIGS. 5 to 9, the side sill inner 11 includes an inner-side reinforcement member 60 and an inner lateral ridge line reinforcement member 70 (see FIGS. 3, 5, 6, and 8).

The inner-side reinforcement member 60 is provided in the side sill inner front end part 17 and reinforces the side sill inner front end part 17. The inner-side reinforcement member 60 is joined to the inner front face part 171 and the inner-side side face part 14 of the inner front end rear part 172 in the side sill inner front end part 17 from inside the closed cross section 10s of the side sill 10 so as to diagonally couple them to each other.

Specifically, as illustrated in the drawings such as FIGS. 5 to 9, the inner-side reinforcement member 60 includes: an inner-side reinforcement member front part 61 that extends horizontally in the vehicle width direction so as to be capable of being joined to the inner front face part 171; an inner-side reinforcement member side face part 62 that extends horizontally in the front-rear direction so as to be capable of being joined to the inner-side side face part 14; and a diagonal part 63 that extends horizontally from a front end of the inner-side reinforcement member side face part 62 to an inner end in the vehicle width direction of the inner-side reinforcement member front part 61 so as to incline outward in the vehicle width direction as it extends forward. A portion of the inner-side reinforcement member 60 that straddles the inner vertical ridge line 141 in a direction in which the inner-side reinforcement member extends, that is, the diagonal part 63 is provided so as to be located away from the inner vertical ridge line 141 toward the inner side of the closed cross section 10s.

In this embodiment, the inner-side reinforcement member 60 is disposed at the same height position as the outer-side reinforcement member 50 and at a position coinciding with the outer-side reinforcement member in the front-rear direction. Thus, the inner-side reinforcement member 60 and the outer-side reinforcement member 50 are opposed to each other with the closed cross section 10s interposed in between.

A bead 64 that protrudes inward in the vehicle width direction is provided at an intermediate position in the vertical direction of the inner-side reinforcement member 60. As illustrated in FIGS. 5, 6, and 9, the bead 64 is formed so as to extend continuously over a part in the direction in which the inner-side reinforcement member 60 extends, at least over the diagonal part 63, and in this example, extend continuously over the entire length of the inner-side reinforcement member in the direction in which it extends.

Note that, FIG. 9 is a horizontal cross-sectional view of the side sill front end part 31 taken at the level of the bead 64.

The inner-side reinforcement member 60 is formed to have a higher strength than the outer-side reinforcement member 50.

In this example, the inner-side reinforcement member 60 and the outer-side reinforcement member 50 are both formed of an ultra-high-tensile steel plate, and the inner-side reinforcement member 60 is formed of a material having a higher strength than the outer-side reinforcement member 50 in such a way that the outer-side reinforcement member 50 has a tensile strength of approximately 590 MPa while the inner-side reinforcement member 60 has a tensile strength of approximately 980 MPa. In addition, the inner-side reinforcement member 60 is formed to be thicker than the outer-side reinforcement member 50 in such a way that the outer-side reinforcement member 50 has a thickness of approximately 2.0 mm while the inner-side reinforcement member 60 has a thickness of approximately 2.3 mm.

Note that, although the inner-side reinforcement member 60 is formed of a material having a higher strength than the outer-side reinforcement member 50 and formed to be thicker than the outer-side reinforcement member in this example, the present disclosure is not limited to this. For example, the inner-side reinforcement member 60 may be formed to have a higher strength than the outer-side reinforcement member 50 in such a way that the inner-side reinforcement member 60 is formed to be thicker than the outer-side reinforcement member 50 while both of them are formed of a material of the same strength, or in such a way that the inner-side reinforcement member 60 is formed of a material having a higher strength than the outer-side reinforcement member 50 while both of them are formed to have the same thickness.

In addition, as illustrated in the drawings such as FIGS. 6 and 8, the inner lateral ridge line reinforcement member 70 described above extends along the inner lateral ridge line 142 located in the boundary part between the inner-side upper face part 12 and the inner-side side face part 14. Further, the inner lateral ridge line reinforcement member 70 includes an inner-side reinforcement upper wall 71 and an inner-side reinforcement vertical face 72, and is formed so that its cross section taken along the plane orthogonal to the longitudinal direction, in which an inner end in the vehicle width direction of the inner-side reinforcement upper wall 71 and an upper end of the inner-side reinforcement vertical face 72 are formed integrally, has an L shape. The inner lateral ridge line reinforcement member 70 extends linearly and continuously from the vicinity of the inner front face part 171 of the side sill inner 11 to a position behind at least a rear end of the side sill inner front end part 17. Thus, as illustrated in FIGS. 5 and 6, a front part of the inner lateral ridge line reinforcement member 70 is provided at a position overlapping with the inner-side reinforcement member side face part 62 of the inner-side reinforcement member 60 in the front-rear direction.

By joining the inner-side reinforcement upper wall 71 to the inner-side upper face part 12 and joining the inner-side reinforcement vertical face 72 to the inner-side side face part 14 in a corner part between the inner-side upper face part 12 and the inner-side side face part 14 of the side sill inner 11, the inner lateral ridge line reinforcement member 70 reinforces the inner lateral ridge line 142 located in the boundary part between the inner-side upper face part 12 and the inner-side side face part 14.

In addition, as illustrated in FIGS. 3 and 4 and FIGS. 7 to 9, a front-end protrusion part 57 that protrudes inward in the closed cross section 10s is provided in a front part of the outer-side reinforcement member 50 described above. The front-end protrusion part 57 is provided in the outer-side reinforcement member 50 at the same height position as the bead 64 of the inner-side reinforcement member 60 and at a position coinciding with the bead in the front-rear direction.

The front-end protrusion part 57 extends in the vehicle width direction, and protrudes rearward relative to a rear face of the outer front face part 271 (inward in the closed cross section 10s) so that an inner end in the vehicle width direction of the front-end protrusion part 57 is located at an inner end in the vehicle width direction of the outer-side reinforcement member 50. The front-end protrusion part 57 is formed in such a way that it protrudes further rearward as it extends inward in the vehicle width direction so that a portion formed between itself and the rear face of the outer front face part 271 opens to the inner side in the vehicle width direction.

As illustrated in FIGS. 1 and 2, the vehicle-body lower structure 1 of a vehicle of this embodiment described above includes the side sill 10 that is disposed in a lower part and on the outer side in the vehicle width direction of the vehicle and the wheel 6 that is located ahead of the side sill outer 21.

By the side sill inner 11 located on the inner side in the vehicle width direction and the side sill outer 21 located on the outer side in the vehicle width direction collaborating with each other, the side sill 10 forms the closed cross section 10s that extends in the front-rear direction of the vehicle (see FIG. 3).

In addition, as illustrated in FIGS. 3 to 5 and FIGS. 7 to 9, the vehicle-body lower structure 1 of a vehicle of this embodiment includes the outer-side reinforcement member 50 that is joined to the side sill outer front end part 27 (a front end part of the side sill outer 21) from inside the closed cross section 10s. The outer-side reinforcement member 50 has a shape extending along the outer front face part 271 (a front face part) of the side sill outer front end part 27 and the outer-side side face part 24 (a side face part).

Further, as illustrated in FIG. 3 and FIGS. 5 to 9, the vehicle-body lower structure 1 of a vehicle of this embodiment includes the inner-side reinforcement member 60 that is joined to the side sill inner front end part 17 (a front end part of the side sill inner 11) from inside the closed cross section 10s. The inner-side reinforcement member 60 diagonally couples the inner front face part 171 (a front face part) of the side sill inner front end part 17 and the inner-side side face part 14 (a side face part) to each other.

The working effects of the vehicle-body lower structure 1 of a vehicle described above will be described using FIGS. 10A-10D.

FIGS. 10A-10D are cross-sectional views illustrating, based on FIG. 9, a simulation analysis result of behaviors of the side sill front end part 31 observed when a collision load is input to the side sill front end part 31 at the time of a small overlap collision.

Note that, FIGS. 10A-10D illustrate, in the order of 10A to 10D, processes from a collision initial phase to a collision later phase in chronological order. Dots in this drawing indicate a stress distribution image, and a portion where dots are denser indicates higher stress (collision energy).

Once the wheel 6 pulled back at the time of the small overlap collision collides with the side sill front end part 31, a collision load directed to the rear side of the vehicle and to the inner side thereof in the vehicle width direction is input to the side sill outer front end part 27. In this embodiment, since the wheel 6 is disposed at a position closer to the outer side in the vehicle width direction than the side sill 10 (that is, the wheel has, what is called, a layout such that it protrudes outward relative to the side face of the vehicle body) (see FIG. 1), as illustrated in the stress distribution of FIG. 10A, the collision load from the wheel 6 is input mainly to the side sill outer front end part 27 of the side sill front end part 31.

Figure 10A:
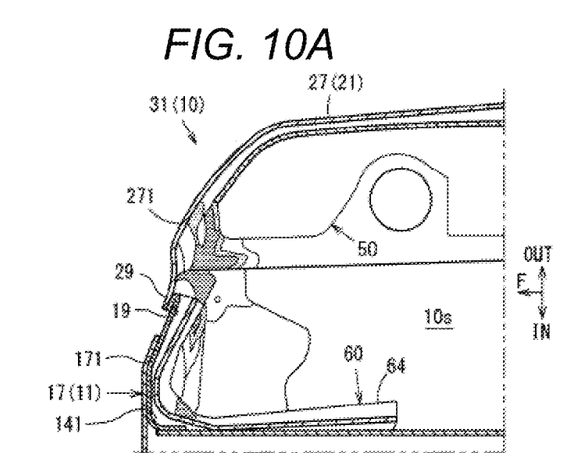
FIGS. 10A-10D are horizontal cross-sectional views illustrating a simulation analysis result of behaviors of the vehicle's side sill front end part at the time of a small overlap collision.
Figure 10B:
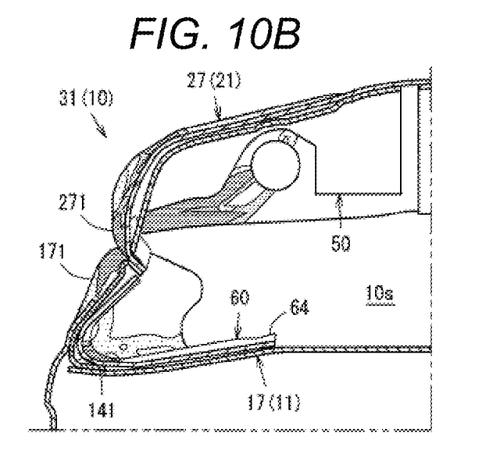

Here, since the side sill outer front end part 27 includes the outer-side reinforcement member 50, as illustrated in FIG. 10B, the side sill outer front end part is hardly crushed by the input of the collision load directed inward in the vehicle width direction and tries to be displaced inward in the vehicle width direction while substantially keeping its shape.

Figure 10C:
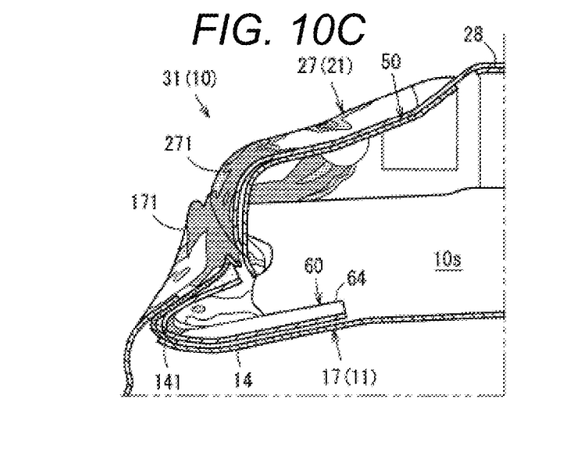

Meanwhile, a load directed inward in the vehicle width direction is input to the side sill inner front end part 17 by the side sill outer front end part 27 that tries to be displaced inward in the vehicle width direction. By such a load directed inward in the vehicle width direction, as illustrated in FIG. 10C, the inner front face part 171 and the outer front face part 271 forming a front face of the side sill front end part 31 are deformed into an M shape in a plan view such that their central part in the vehicle width direction protrudes to the inner side of the closed cross section 10s (rearward) relative to their both inner and outer sides in the vehicle width direction.

Figure 10D:
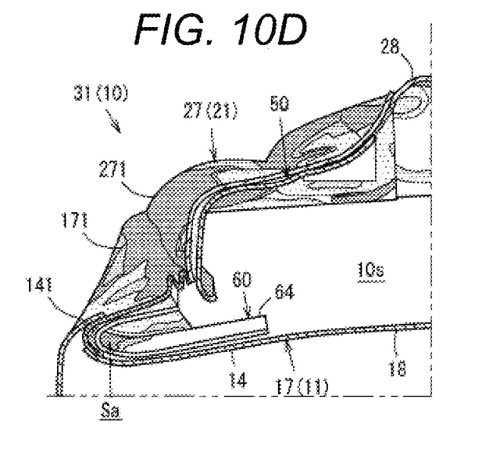

Here, since the side sill inner front end part 17 includes the inner-side reinforcement member 60 that diagonally couples the inner front face part 171 and the inner-side side face part 14 to each other, as illustrated in FIG. 10D, it is possible to inhibit the inner vertical ridge line 141 from being bent and deformed by the load directed inward in the vehicle width direction and input by the side sill outer front end part 27. Thus, a space Sa is secured in a corner portion between the inner front face part 171 and the inner-side side face part 14. In other words, as illustrated in FIG. 10D, the inner-side reinforcement member 60 can inhibit the side sill inner front end part 17 from being crushed and deformed in the vehicle width direction.

Accordingly, at the time of the small overlap collision, the side sill front end part 31 can generate a reaction force in the vehicle width direction, which is large enough to bounce the wheel 6 back outward for example, against the collision load directed inward in the width direction and input by the wheel 6. As a consequence, at the time of the small overlap collision, the vehicle-body lower structure 1 of a vehicle of this embodiment enables the vehicle body to evade a barrier in the vehicle width direction, and thus can inhibit the vehicle body from being reinforced excessively.

As an aspect of the present disclosure, as illustrated in FIG. 3 and FIGS. 5 to 9, the inner vertical ridge line 141 extending in the vertical direction is formed in the boundary part between the inner front face part 171 of the side sill inner front end part 17 and the inner-side side face part 14, and as illustrated in FIGS. 7 and 9, the diagonal part 63 of the inner-side reinforcement member 60 is provided so as to be located away from the inner vertical ridge line 141 toward the inner side of the closed cross section 10s.

According to the above configuration, it is possible to efficiently inhibit the inner vertical ridge line 141 from being bent and deformed at the time of a small overlap collision while suppressing a weight increase of the inner-side reinforcement member 60 provided between the inner front face part 171 of the side sill inner front end part 17 and the inner-side side face part 14.

As another aspect of the present disclosure, as illustrated in FIGS. 5 to 9, a portion of the inner-side reinforcement member 60 in the direction in which the inner-side reinforcement member extends, at least the diagonal part 63, has the bead 64 that protrudes to the inner side of the closed cross section 10s (outward in the vehicle width direction and rearward), which makes it possible to enhance the bending rigidity of the part in the direction in which the inner-side reinforcement member 60 extends, especially the diagonal part 63, and further inhibit the inner vertical ridge line 141 of the side sill inner front end part 17 from being bent and deformed.

As still another aspect of the present disclosure, as illustrated in FIGS. 3 and 4 and FIGS. 7 to 9, the outer-side reinforcement member 50 has the front-end protrusion part 57 (a protrusion part), which protrudes inward in the closed cross section 10s (rearward), at the same height position as the bead 64 of the inner-side reinforcement member 60 and at a position coinciding with the bead in the front-rear direction.

According to the above configuration, at the time of input of a collision load directed inward in the vehicle width direction and input to the side sill front end part 31, depending on its input mode, it is possible to cause the front-end protrusion part 57, which is included in the outer-side reinforcement member 50 displaced inward in the vehicle width direction, to engage with (come into contact with) the bead 64 of the inner-side reinforcement member 60 (for example, an inner end in the vehicle width direction of the bead 64 in the inner-side reinforcement member front part 61) from the outer side in the vehicle width direction.

Thus, a load transmission part that extends continuously to the inner side in the vehicle width direction is formed between the outer-side reinforcement member 50 and the inner-side reinforcement member 60, which helps transmission of the load to the inner side in the vehicle width direction.

As still another aspect of the present disclosure, the inner-side reinforcement member 60 is formed to have higher strength than the outer-side reinforcement member 50.

According to the above configuration, the inner-side reinforcement member 60, which has high strength relative to the outer-side reinforcement member 50, receives and supports the outer-side reinforcement member 50 that is displaced inward in the vehicle width direction when a collision load directed inward in the vehicle width direction is input to the side sill front end part 31, whereby the collision load directed inward in the vehicle width direction can be received effectively.

In addition, since the outer-side reinforcement member 50 is formed to have lower strength than the inner-side reinforcement member 60, it is possible to suppress an increase in material cost and weight as compared to a case where both the outer-side reinforcement member 50 and the inner-side reinforcement member 60 are formed to have high strength.

As still another aspect of the present disclosure, as illustrated in FIGS. 3, 5, 6, and 8, the inner lateral ridge line reinforcement member 70 is provided so as to reinforce the inner lateral ridge line 142 (see FIGS. 6 and 8) extending in the front-rear direction along the boundary part between the inner-side upper face part 12 and the inner-side side face part 14 of the side sill inner 11. As illustrated in FIGS. 5 and 6, the inner lateral ridge line reinforcement member 70 extends in the front-rear direction along the inner lateral ridge line 142 and is provided at a position overlapping with the inner-side reinforcement member 60 in the front-rear direction.

According to the above configuration, when a rearward collision load is input to the side sill front end part 31, the collision load directed to the rear side of the vehicle having been input to the inner-side reinforcement member 60 can be transmitted to the rear side of the vehicle efficiently by the inner lateral ridge line reinforcement member 70.

The present disclosure is not limited only to the configuration of the above embodiment and can be formed by various embodiments.

DESCRIPTION OF REFERENCE SIGNS AND NUMERALS

1 VEHICLE-BODY LOWER STRUCTURE OF VEHICLE
6 WHEEL
10 SIDE SILL
10s CLOSED CROSS SECTION
11 SIDE SILL INNER
12 INNER-SIDE UPPER FACE PART (UPPER FACE PART OF SIDE SILL INNER)
14 INNER-SIDE SIDE FACE PART (SIDE FACE PART OF FRONT END PART OF SIDE SILL INNER, SIDE FACE PART OF SIDE SILL INNER)
17 SIDE SILL INNER FRONT END PART (FRONT END PART OF SIDE SILL INNER)
21 SIDE SILL OUTER
24 OUTER-SIDE SIDE FACE PART (SIDE FACE PART OF FRONT END PART OF SIDE SILL OUTER)
27 SIDE SILL OUTER FRONT END PART (FRONT END PART OF SIDE SILL OUTER)
50 OUTER-SIDE REINFORCEMENT MEMBER
57 FRONT-END PROTRUSION PART (PROTRUSION PART)
60 INNER-SIDE REINFORCEMENT MEMBER
63 DIAGONAL PART (PORTION STRADDLING INNER VERTICAL RIDGE LINE IN DIRECTION IN WHICH INNER-SIDE REINFORCEMENT MEMBER EXTENDS)
64 BEAD
70 INNER LATERAL RIDGE LINE REINFORCEMENT MEMBER
141 INNER VERTICAL RIDGE LINE
142 INNER LATERAL RIDGE LINE
171 INNER FRONT FACE PART (FRONT FACE PART OF FRONT END PART OF SIDE SILL INNER)
271 OUTER FRONT FACE PART (FRONT FACE PART OF FRONT END PART OF SIDE SILL OUTER)

The invention claimed is:

1. A vehicle-body lower structure of a vehicle comprising:
a side sill that is disposed in a lower part and on an outer side in a vehicle width direction of a vehicle and has a side sill inner structure located on an inner side in the vehicle width direction and a side sill outer structure located on the outer side in the vehicle width direction, the side sill inner structure and the side sill outer structure collaborating with each other to form a closed cross section that extends in a front-rear direction of the vehicle;
a wheel that is located ahead of the side sill outer structure in the front-rear direction of the vehicle;
an outer-side reinforcement structure that has a shape extending along a front face part and a side face part in a front end part of the side sill outer structure and is joined to the front end part from the closed cross section side; and
an inner-side reinforcement structure that diagonally couples a front face part and a side face part in a front end part of the side sill inner structure to each other.

2. The vehicle-body lower structure of a vehicle according to claim 1, wherein
an inner vertical ridge line that extends in a vertical direction is formed in a boundary part between the front face part and the side face part of the front end part of the side sill inner structure, and
a portion of the inner-side reinforcement structure that straddles the inner vertical ridge line in a direction in which the inner-side reinforcement structure extends is provided so as to be located away from the inner vertical ridge line toward the inner side of the closed cross section.

3. The vehicle-body lower structure of a vehicle according to claim 2, wherein the portion of the inner-side reinforcement structure that straddles the inner vertical ridge line in the direction in which the inner-side reinforcement structure extends has a bead that protrudes to the inner side or the outer side of the closed cross section.

4. The vehicle-body lower structure of a vehicle according to claim 3, wherein the bead extends continuously at least over the portion of the inner-side reinforcement structure that straddles the inner vertical ridge line in the direction in which the inner-side reinforcement structure extends.

5. The vehicle-body lower structure of a vehicle according to claim 4, wherein the outer-side reinforcement structure has a protrusion part, which protrudes inward in the closed cross section, at a same height position as the bead of the inner-side reinforcement structure and at a position coinciding with the bead in the front-rear direction.

6. The vehicle-body lower structure of a vehicle according to claim 5, wherein the inner-side reinforcement structure is formed to have higher strength than the outer-side reinforcement structure.

7. The vehicle-body lower structure of a vehicle according to claim 6, further comprising
an inner lateral ridge line reinforcement structure that reinforces an inner lateral ridge line extending in the front-rear direction along a boundary part between an upper face part and the side face part of the side sill inner, wherein
the inner lateral ridge line reinforcement structure extends in the front-rear direction along the inner lateral ridge line and is provided at a position overlapping with the inner-side reinforcement structure in the front-rear direction.

8. The vehicle-body lower structure of a vehicle according to claim 1, wherein the inner-side reinforcement structure is formed to have higher strength than the outer-side reinforcement structure.

9. The vehicle-body lower structure of a vehicle according to claim 1, further comprising
an inner lateral ridge line reinforcement structure that reinforces an inner lateral ridge line extending in the front-rear direction along a boundary part between an upper face part and the side face part of the side sill inner, wherein
the inner lateral ridge line reinforcement structure extends in the front-rear direction along the inner lateral ridge line and is provided at a position overlapping with the inner-side reinforcement structure in the front-rear direction.

* * * * *